United States Patent
Segal et al.

(10) Patent No.: US 8,733,650 B1
(45) Date of Patent: May 27, 2014

(54) DECODING BARCODES FROM IMAGES WITH VARYING DEGREES OF FOCUS

(75) Inventors: Aleksandr V. Segal, London (GB); Arnab S. Dhua, Mountain View, CA (US); Max Delgadillo, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 211 days.

(21) Appl. No.: 13/465,900

(22) Filed: May 7, 2012

Related U.S. Application Data

(60) Provisional application No. 61/589,157, filed on Jan. 20, 2012.

(51) Int. Cl.
*G06K 5/00* (2006.01)
(52) U.S. Cl.
USPC ...................... 235/437; 235/436; 235/462.25
(58) Field of Classification Search
USPC ..................................... 235/437, 462.25, 436
See application file for complete search history.

(56) References Cited

U.S. PATENT DOCUMENTS

2012/0080515 A1* 4/2012 van der Merwe ............. 235/375

* cited by examiner

*Primary Examiner* — Kristy A Haupt
(74) *Attorney, Agent, or Firm* — Novak Druce Connolly Bove + Quigg LLP

(57) ABSTRACT

Various algorithms are presented that enable an image of a barcode, captured by a camera of an electronic device, to be analyzed and decoded for use in obtaining information about an object or item associated with the barcode. The algorithms can account for variations in focus of the image, as may result in blur due to movement or a lack of auto-focus features. An offline training phase can be used to generate a set of possible symbol appearance templates, where at least some of the templates reflect simulations for varying levels and types of noise in an image. A decoding phase compares these templates to a captured image and performs a sequence-wide optimization to determine the overall most likely sequence of digits.

30 Claims, 9 Drawing Sheets

DECODING BARCODES FROM IMAGES WITH VARYING DEGREES OF FOCUS

CROSS-REFERENCE TO RELATED CASES

This case claims priority to U.S. Provisional Patent Application No. 61/589,157, filed Jan. 20, 2012, and entitled "Decoding Barcodes from Non-Auto-Focus Camera Images," which is hereby incorporated herein by reference for all purposes.

BACKGROUND

As portable electronic devices offer an ever-increasing amount of functionality, people are using these devices to assist with a greater variety of tasks. As an example, a person in a store might want to obtain information about an item, such as reviews for a book or a price from a retailer of that item. Some applications enable a user to capture an image of a barcode on an item, and upload that image to a central server where the image can be analyzed and decoded. Such an approach can require a significant amount of time and bandwidth to upload, and requires an acceptable cellular signal in many instances, which can be difficult to obtain in large brick and mortar stores or other such locations. While the functionality could be loaded onto the device, the varying amount of focus and resolution can make it difficult to decode these images using conventional algorithms, thus requiring a significant amount of processing capacity and power consumption, which might be unavailable or at least undesirable for a user of a small portable device.

BRIEF DESCRIPTION OF THE DRAWINGS

Various embodiments in accordance with the present disclosure will be described with reference to the drawings, in which.

DETAILED DESCRIPTION

Figure 1A:
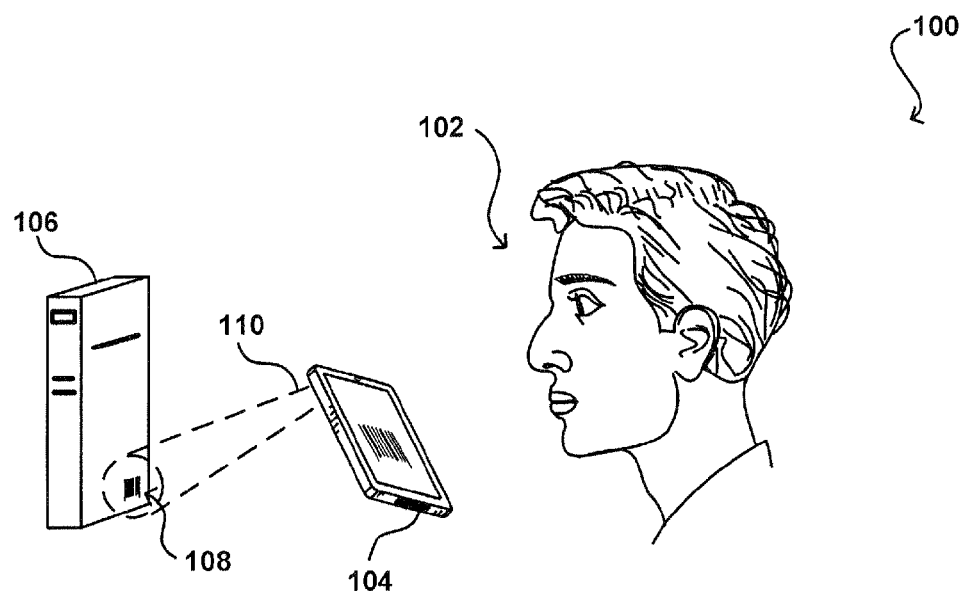
FIGS. 1(a) and 1(b) illustrate an example situation wherein a user captures an image of a barcode using a portable electronic device, which is then displayed on the electronic device.

Systems and methods in accordance with various embodiments of the present disclosure may overcome one or more of the aforementioned and other deficiencies experienced in conventional approaches to obtaining information from a visual code. In particular, various embodiments provide for the recognizing and decoding of any of a number of types of barcodes from a captured image that includes at least a readable portion of the barcode, where that image may have been captured using a camera that was not clearly focused on the barcode.

An image including a barcode can have been captured using an image capture element of any appropriate device, such as a digital camera of a portable computing device. Because the cameras in such devices may not include an auto-focusing feature, or may utilize an auto-focusing feature that does not always focus on the intended item, the image can be at least partially blurred or otherwise out of focus. For devices with fixed focus cameras, the focal distance is often set to a few meters, such that images of barcodes captured at short distances will tend to be very out of focus. Further, a device such as a tablet computer or smart phone often is held in a user's hand, and thus might be moving slightly while capturing the image. Any of a number of other reasons might lead to the image not being sufficiently in focus for conventional barcode reading algorithms to provide an accurate result in at least some cases.

At least some embodiments can take advantage of an offline training phase and an online decoding phase, among other such options. During the training phase, a database of symbols can be obtained that can be utilized at various digit locations in a barcode. For each symbol, a set of models or templates can be generated for each of a plurality of noise levels and/or sources, as may include different levels of blur, amounts of sensor noise, and different lighting conditions. A simulation or approximation can be performed for various values and/or combinations of these noise sources, with at least some of the results being stored to the library as appearance models for a respective symbol. Each appearance model can be used to attempt to match the appearance of a character in a captured image.

During a decoding phase, the appearance models can be utilized with a set of processing techniques to attempt to match characters in a received image. A decoding process in accordance with at least one embodiment includes generating a table of likely decodes for each position in a potential barcode, along with the associated scores for each likely decode. A dynamic programming technique can be used to perform a sequence-wide optimization and find the overall most likely sequence of digits. Various other phases and implementations can be used as well as discussed elsewhere herein.

Algorithms also can be configured to handle variations of specific barcode standards, as well as multiple barcode formats such as, but not limited to, UPC-A, EAN-13, UPC-E, and EAN-8 barcodes. At least some of these algorithms also can be executed quickly enough, and with a minimal amount of resources, such that in at least some embodiments the entire barcode reading and decoding process can be performed on the portable computing device. In other embodiments, a captured image or other such information can be sent to a remote server or other device for analysis, which then can return information relating to the barcode to the device.

Various other applications, processes and uses are presented below with respect to the various embodiments.

Figure 1B:
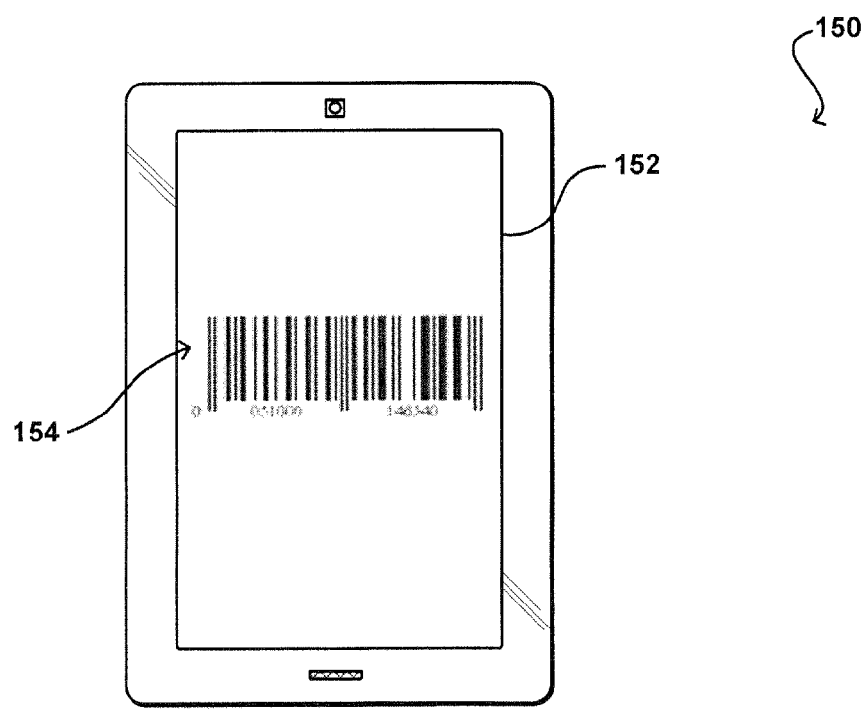

FIG. 1(a) illustrates an example environment 100 wherein a user 102 is operating an electronic device 104 that includes at least one image capture element. In this example, the user 102 locates an item or object of interest 106. If the user wants to obtain information about the item, such as a description or pricing information, the user 102 can manipulate the electronic device 104 until a viewable area 110 of a camera of the device includes a barcode 108 positioned on, attached to, or otherwise associated with, the item of interest 108. FIG. 1(b) illustrates an example of the barcode 154 when displayed as part of the captured image on a display element 152 of an electronic device 150.

Figure 2A:
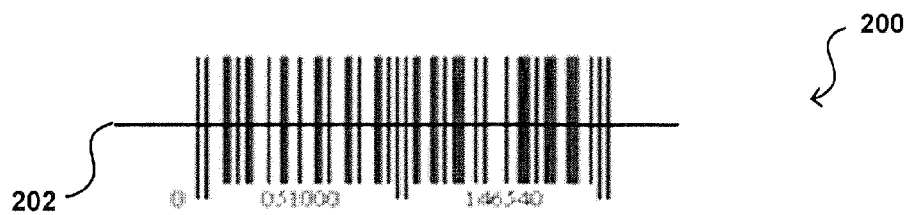
FIGS. 2(a), 2(b), 2(c), and 2(d) illustrate example barcode images and barcode signals that can be obtained and/or analyzed in accordance with various embodiments.

FIG. 2(a) illustrates an enlarged view 200 of the example barcode displayed on the device in FIG. 1(b). As can be seen, the barcode in this example includes twelve digits (1-12), with each digit being represented by a 7-bit pattern. The bit pattern is comprised of a number of "vertical" lines that are either black or white, corresponding to a value of 1 or 0, respectively. The dotted lines represent the separation between patterns for adjacent digits. This example barcode also has a start pattern (S), a middle pattern (M), and an end pattern (E) as known in the art, for a total of ninety-five bits of information. In the figure, the start (left edge), middle, and end (right edge) patterns are each represented by a pair of lines that extend lower than the lines for each digit. As should be understood, other barcode formats can utilize different patterns or approaches as known in the art. A line 202 across the barcode 200 can be analyzed to attempt to determine the locations of the transitions, and thus decipher the barcode. As illustrated in the plot 220 of FIG. 2(a), a clear, focused image of a barcode can produce a barcode signal that has distinct transitions between white regions and black regions, which in this example are normalized to have values of 1 and 0, respectively. By using thresholds such as less than 0.2 for black regions and more than 0.8 for white regions, for example, the transition points between values at these thresholds can be used to determine transition locations that can determine the digits of the barcode.

Figure 2B:
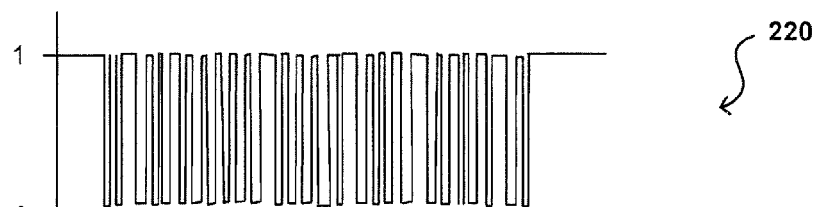
Figure 2C:
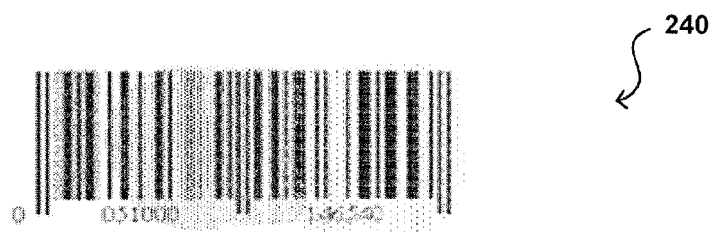
Figure 2D:
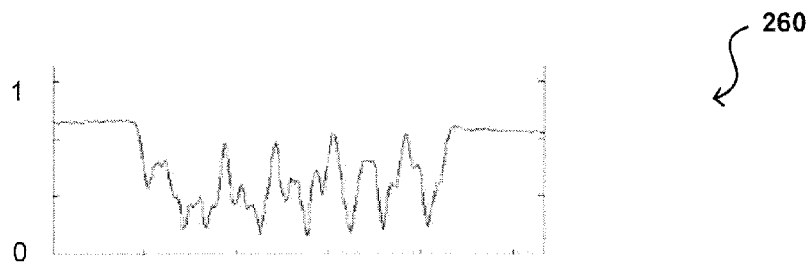

As mentioned, however, an image captured of a barcode may often be at least slightly out of focus due to factors such as movement of the capturing device, movement of the item being captured, lack of an auto-focus feature on the capturing device, or a failure of the user to wait until the image is properly focused. As illustrated in the example barcode image 240 of FIG. 2(c), improper focus can result in images that do not have clear transitions between black and white bars in the barcodes, but instead have differing regions or amounts of gray near the transitions. A lack of clear transitions can make it difficult to properly decipher the digits of the barcode. For example, the plot 260 of FIG. 2(d) illustrates that there are not clear transitions in the example barcode signal, and the values of the transitions may not be sufficient to cross the thresholds to be registered as values transitions. Further, aspects such as lighting variations and sensor noise can increase the difficulty in properly locating and analyzing a barcode in a captured image as illustrated. One approach is to use thresholding to convert the grayscale image into a binary black and white image (such as by setting any pixels in the image above a given threshold to black and all others to white), but such an approach is prone to error and can result in poor decoding performance. Due to the potential for a wide range of image qualities based at least in part upon the image capture conditions, it can be desirable to utilize an image analysis and/or decoding algorithm that is sufficiently robust to such variation in image quality.

Approaches in accordance with various embodiments are able to deal with various image degradations present in images that are not optimal for analysis, such as low quality images captured by non-auto-focus cameras contained in various conventional smart phones, tablet computers, and other such devices. Various approaches can resolve ambiguities in the process, and determining a relatively likelihood of potential outcomes enables such an approach to be robust to false positives up to a given confidence.

As mentioned above, approaches described herein can include at least two stages, phases, or portions, as may include an offline training portion and an online recognition, analysis, and/or decoding portion. An offline training portion can be used to create or obtain a database or library of various shapes, characters, and other such information. For each character in such a library, a set of models or templates can be generated for each of a plurality of sources of noise or distortion in an image. A simulation or approximation can be performed for various values and/or combinations of these noise sources, with at least some of the results being stored to the library as appearance models for a respective symbol. During a decoding portion, the appearance models can be utilized with a set of processing techniques to attempt to match characters in a received image. Aside from any pre-processing and/or post-processing steps, a decoding processing accordance with at least one embodiment includes generating a table or set of likely decodes for each position in a potential barcode, along with the associated scores as discussed elsewhere herein. A dynamic programming technique then can be used to perform a sequence-wide optimization and find the overall most likely sequence of digits. In one example decoding process, an image goes through stages including pre-processing, barcode limit detection and signal scale normalization, symbol scoring, sequence optimization, and thresholding. Various other stages and implementations can be used as well as discussed and suggested elsewhere herein.

Figure 3:
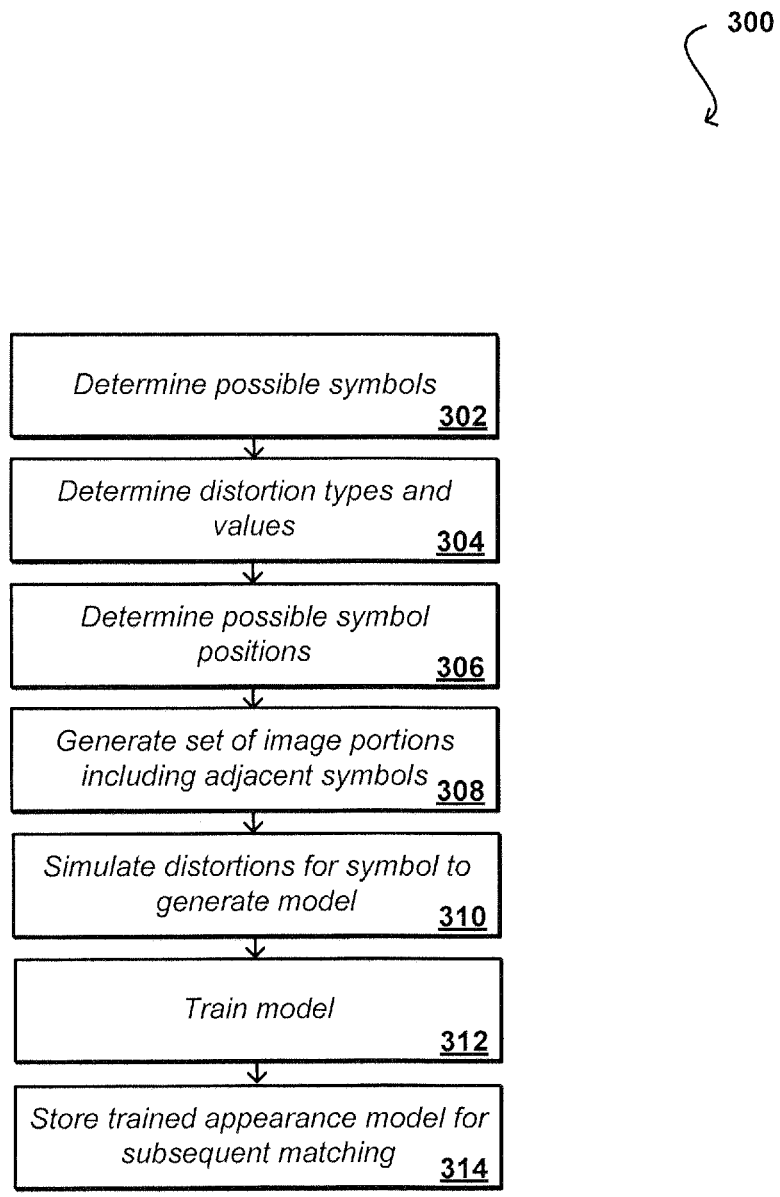
FIG. 3 illustrates an example process for generating a library of appearance models in accordance with various embodiments.

As mentioned, a first offline phase of a decoding process involves building a set of appearance models for use in comparing portions of an image to be processed. One such process will be described with respect to FIG. 3. It should be understood, however, that there can be additional, fewer, or alternative steps performed in similar or alternative orders, or in parallel, within the scope of the various embodiments unless otherwise stated. In this example process, a set of possible barcode symbols is determined 302, where at least one appearance model will be built for each symbol in a dictionary or library for at least one barcode format. As used herein, a symbol refers to a specific encoding of a numeral, character, or guard pattern (a special pattern denoting the start, stop, or other significant point in the barcode). A set of image distortion types and values also can be determined 304. As mentioned, there might be types and levels of image distortion to be handled, as may include differing levels of blur, amounts of sensor noise, lighting conditions, resolution constraints, and the like. One or more models can be generated for each symbol according to the determined types and levels of distortion. In at least some embodiments, such a model can capture the variability of symbol appearance due to factors such as minor shifts along a primary axis of the barcode, blurring (with a range of possible blurring kernels) against all possible combinations of preceding and proceeding symbols or digits, and additive sensor noise. At least some embodiments can also consider adjacent symbols, as the blurring process can often cause symbol appearance to depend at least in part upon the one or more adjacent symbols, depending on location in the barcode.

Figure 4:
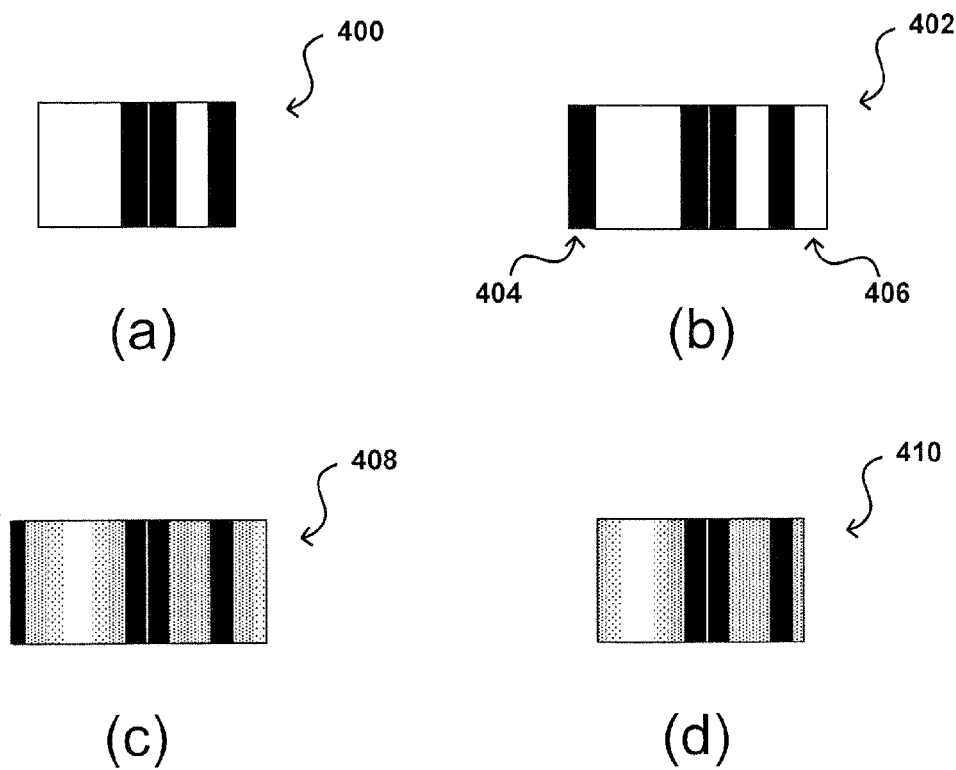
FIGS. 4(a), 4(b), 4(c), and 4(d) illustrate examples of digit templates that can be utilized in accordance with various embodiments.

In at least one embodiment, a generative probabilistic model for the given symbol is created using an artificial data set created by simulating variations in any or all of the above parameters. For each symbol, the set of possible positions where the symbol can occur is determined 306. These positions constrain the other symbols that can be adjacent to a particular symbol, as certain formats only allow for certain symbols to be used in certain positions. In the EAN-13 barcode format, for example, the first set of six digits is constrained to be in encoding 'a' or 'b', whereas the second set of six digits is required to be in encoding 'c'. For each possible configuration of previous symbol and next symbol, a corresponding set of grayscale image portions can be generated 308. For example, FIG. 4(a) illustrates an example of a digit pattern 400 for a symbol that can be present in a barcode, represented by (from left to right) three white bars, two black bars, another white bar, and finally another black bar. While a pattern could be created based solely on this seven-bit representation, the matching results can be improved by taking into account any adjacent symbols, such as by extending the pattern 402 for the digit to include at least a portion of the adjacent digits, shown here as bars 404, 406 on either end. For each such configuration, and returning to FIG. 3, various types and levels of distortion can be simulated 310 to generate an initial model for a symbol. For example, the image portions can be blurred at several kernel widths close to the target blur level. For each blur level, the grayscale image portions can be considered to be shifted to the left or right by one or more amounts, as well as stretched along a primary axis about its center. An example of a blurring of a digit pattern 408 is illustrated in FIG. 4(c). At least some of the variations generated through this process can be further distorted by introducing simulated additive noise, etc. At the end of such a process, a set of image portions can be obtained that represent possible variations in the appearance of a symbol in a barcode image. As illustrated in FIG. 4(d), any extension portions of the pattern can be removed to leave a symbol pattern 410 that can be matched with locations of a captured barcode image. At least a portion of these possible variations can be used to train a generative model.

The probabilistic generative model can be trained 312 using one or more approaches discussed herein. In one particular approach to training a generative model, a symbol is selected and a set of n training examplars e generated for the symbol are considered. As discussed, each training examplar can be composed of a set of m grayscale values according to the following definitions:

$$T_S = \{\bar{e}_i\}_{i=1,\ldots,n}$$

$$\bar{e}_i = (e_{i,1}, e_{i,2}, \ldots, e_{i,m})$$

Based at least in part upon on these definitions, at least two generative probabilistic models can be defined for the data. Each of the models can employ a different approximation that is needed at different points in the overall system. A first model, a parametric probability model, can assume a jointly Gaussian distribution of observation values given a symbol template. A second example probability model can be nonparametric, thus avoiding the Gaussian assumption, and can introduce an independence assumption on the individual observed grayscale values. For purposes of explanation, the models will be referred to herein as $P_1$ and $P_2$, respectively. If $\bar{o}$ is the observed signal, the likelihood of the symbol under the two models can be defined as:

$$P_1(\bar{o}, T_S) = N(\bar{o}; E[T_S], V[T_S])$$

$$P_2 = (\bar{o}, T_S) = \frac{1}{\alpha}\left(\sum_{i=1}^{n}((1-\beta)\cdot N(\bar{o}; \bar{e}_1, \sigma\cdot I_{m,m}) + \beta\cdot U(\bar{o};[0,255]))\right)$$

In this notation, α is the normalization constant, β is the expected outlier rate, N is the Gaussian density, and U is the Uniform density over grayscale values.

These two probability models can be used together to evaluate the likelihood that an observation was generated by a given symbol. Since a constant lighting level cannot reasonably be expected in at least some embodiments, a deformation model can be specified that allows affine transformations of the grayscale values in an observed signal snippet. The affine warping operator w in at least one embodiment can be defined as:

$$w_{a,b}[\bar{o}] = a\cdot\bar{o} + b$$

The intent here is to imply an equivalence class where:

$$w_{a,b}[\bar{o}] \equiv \bar{o}\,\forall a,b$$

The likelihood of a symbol can be specified as an algorithm making use of the definitions above, such as by:

$$(\hat{a}, \hat{b}) := \underset{a,b}{\mathrm{argmax}}\, P_1(w_{a,b}[\bar{o}]\mid a, b, T_S)\cdot P(a, b\mid T_S)$$

$$l(T_S; \bar{o}) := P_2(w_{\hat{a},\hat{b}}[\bar{o}]\mid T_S)$$

This has the effect of first picking an optimal warp using model $P_1$ such that the warp picked takes into account the large amount of correlation between adjacent values in the image portion, but then assigning the likelihood of the warped signal according to the nonparametric model $P_2$ so that the multimodal nature of the distribution can be captured. In addition, a prior can be placed on the value of (a, b) to discourage unrealistically large deviations from identity warp. This can take the form of a Gaussian prior on the warp parameters, as may be given by:

$$P(a, b\mid T_S) = N\left(\begin{bmatrix}a\\b\end{bmatrix}; \begin{bmatrix}1\\0\end{bmatrix}, \Sigma_{a,b}\right)$$

It should be noted that the final likelihood does not depend directly on the prior, as the prior only influences which warp parameters are selected in this embodiment.

Once the models are sufficiently trained, the appearance models can be stored 314 to an accessible location, such as a central server or network storage, for subsequent use in a matching process. In at least some embodiments, the models can also be stored locally on any electronic device operable to perform at least a portion of the decoding process. In some embodiments, a device can store certain common templates locally, and when necessary can send a request to a remote system or service for processing, etc.

Figure 5:
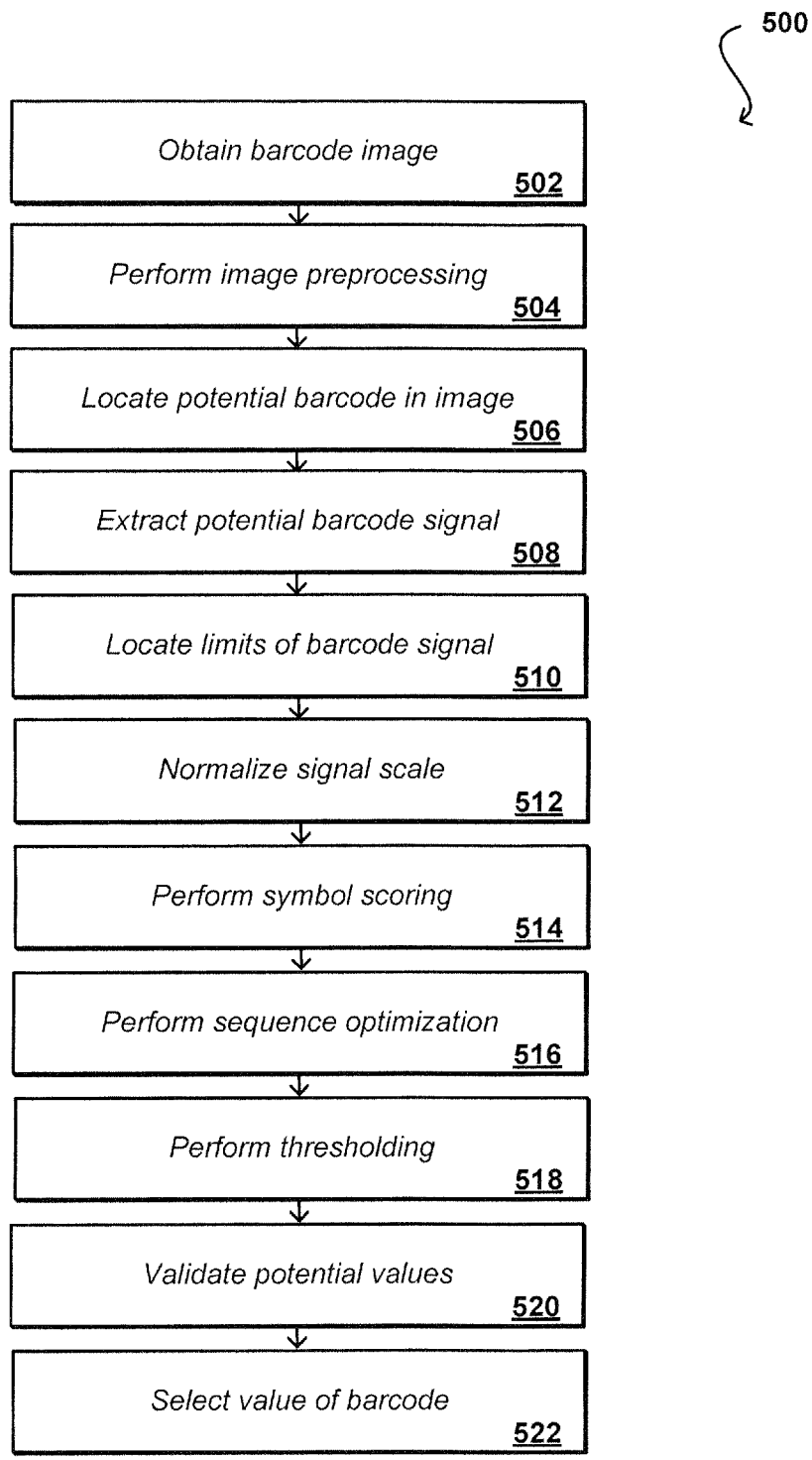
FIG. 5 illustrates an example process for decoding a barcode from an image in accordance with various embodiments.
Figure 6:
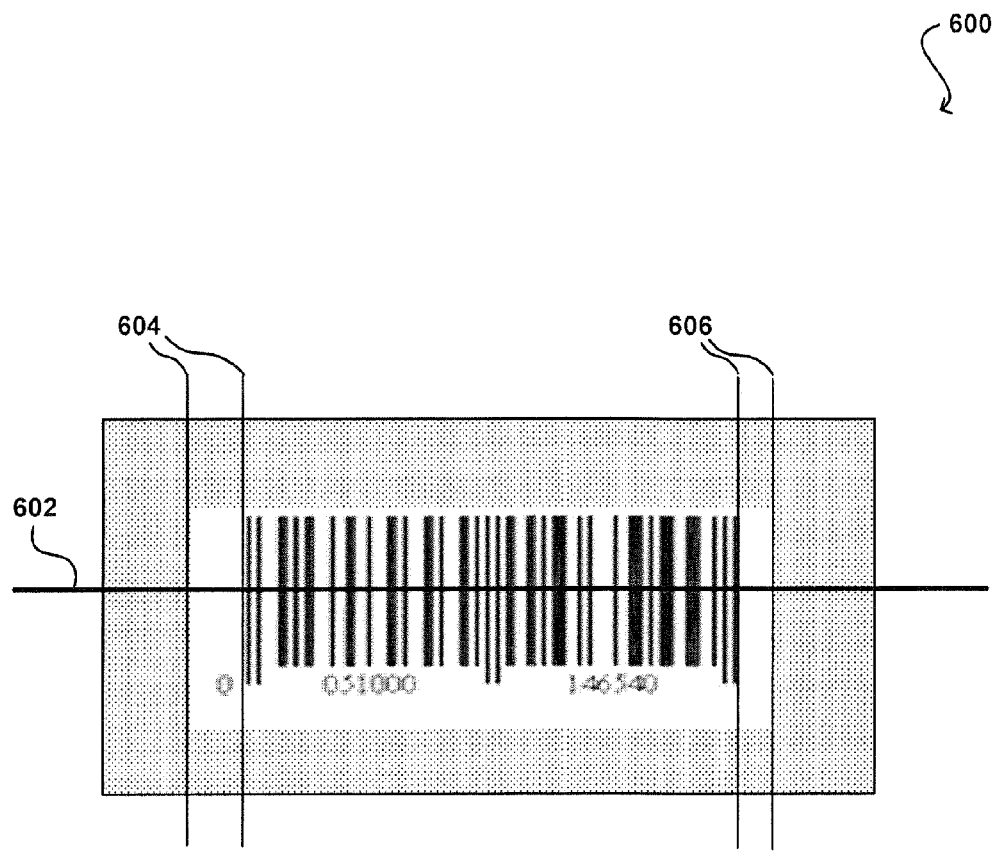
FIG. 6 illustrates an example of aspects of a barcode that can be utilized in accordance with various embodiments.

As mentioned, a second phase of the process can involve using the generated appearance models to attempt to match symbols in a barcode of an image. FIG. 5 illustrates an example of the second phase 500 that can be used in accordance with various embodiments. In this example, an image is obtained 502 that allegedly contains at least one barcode. As discussed, the image can be captured or uploaded by a user, or otherwise obtained. In at least some embodiments, one or more preprocessing steps are performed 504 for the obtained image. For example, an image to be analyzed can be converted to a grayscale (or other monochrome) image, color normalization can be performed, and other such image preprocessing can be performed as desired. Examples of preprocessing for barcode images can be found, for example, in co-pending U.S. patent application Ser. No. 13/095,230, filed Apr. 27, 2011, and entitled "Decoding Barcodes," which is hereby incorporated herein by reference. By looking at image gradients or transitions, using pattern matching, or utilizing another such approach, a region of the image corresponding to a potential barcode can be determined 506. One a region of the image is determined, that region can be analyzed for primary gradient direction, transition location, or other such information to attempt to determine a primary axis of the barcode, which can be used to extract a barcode signal 508. Upon determining a likely primary axis of the barcode, a one-dimensional barcode signal can be generated by selecting a row 602 of the image along that primary axis, as illustrated in the example situation 600 of FIG. 6, and averaging a few of the surrounding rows (i.e., nearby pixels in a direction orthogonal to the primary axis) together in order to reduce the effects of noise. Small angular deviations do not substantially affect the one-dimensional signal, such that in many cases a horizontal or x-axis can be taken as the primary axis by default. The length of the image region over which a signal is determined to correspond, or the limits of the bar code signal, can be determined 510 in a number of different ways. For example, white regions to the left 604 and right 606 of the barcode can be located that correspond to the edges of the barcode, although in other embodiments thresholding or other approaches could be used on the actual signal when generated. For example, this can correspond to locations at the left and right where the deviations, transitions, or slope of the color signal becomes relatively consistent with respect to the coded portion near the center of the potential barcode. In at least some embodiments, the y-axis also can be normalized to reduce the impact of various potential lighting issues. The one-dimensional barcode signal can have an appearance when plotted similar to, for example, the signal illustrated in FIG. 2(b) or FIG. 2(d). A barcode limit detection process can be performed in at least two stages. First, a rough start position and a rough stop position can found. These positions can be refined with one or more expensive optimization techniques, at least one of which can output a set of warping parameters that can be used to de-warp the entire barcode signal into a standard scale. Rough limits can be detected by, for example, searching for a maximum response to up and down edge filters. The response scores can be weighted based on their proximity to anticipated start and end locations of the barcode signal, as well as the amount of whitespace preceding (for the start) or proceeding (for the end) the edge. Such an approach can reliably locate the start and end positions of a barcode to within a few pixels.

In order to refine the initial position estimate, an area around the rough start and/or stop limits can be searches, the sections of signal corresponding to the start and stop symbols fit to the trained template models. Such a fitting process can produce a score and a set of fitting parameters for each offset from the rough positions. A fitting process such as a parabola fitting process can be used to estimate a sub-pixel start and stop location for the barcode. The fitting parameters resulting from the refinement can provide information about de-warping that can be beneficial in order to map the observed start and stop guard symbols into the reference scale. These parameters can be linearly interpolated between the start and stop guard locations in order to de-warp the entire signal into the reference frame of the template models.

In at least one embodiment, the locations along the length of the barcode signal can be determined that best match the templates of the start and stop guards. For purposes of explanation $x_s$ and $x_e$, respectively, will denote these locations. Since a matching comparison approach discussed herein can provide a warp (w) value for each lit, the warp associated with each of these locations ($w_s$ and $w_e$, respectively) can be interpolated against the entire signal. In at least some embodiments, a warp can be applied as given by:

$$w_x = \frac{w_e - w_s}{x_s - x_e}(x - x_s) + w_s$$

Such an approach can place the input signal into the same canonical scale under which the templates were generated, and thus make the two comparable.

Once the signal scale is normalized 512 in at least some embodiments, one or more symbol scoring processes can be performed 514 to attempt to determine likely candidates for each position in the barcode. In one embodiment, the symbol score can essentially be the log-likelihood of that symbol, $l(T_s; \bar{o})$, under the observed image portion at the barcode position in question. A prior term can be added (in log-space) based on the a, b parameters used to compute the likelihood. This prior can invalidate symbols that which require negative a values, and put a slight preference on warps close to the identity warp, $w_{1,0}[\cdot]$. Arbitrary prior distributions can be used where there is no need to have a tractable maximization procedure.

An appropriate fitting procedure can be applied at a set of shifts around the expected location of each position. Since there can be at least some uncertainty about the location of the image portion within the position window, a set of shifts around the expected location can be sampled. The result can be a set or table of log-likelihoods and associated warping parameters for each symbol for each shift location, and for each position. The final scores can be computed by marginalizing out the shifts in this table. A canonical warp can also be computed for each symbol-position pair by taking the expected value of the warp parameters with respect to the shifts. The canonical warp information and the table of shifts for the top candidate symbols can be retained for later use in the sequence optimization phase.

One optimization that can beneficially be performed at this level relates to the inclusion of an area outside the position boundaries as part of both the template building and the scoring process. Since blurring can cause information to "bleed" across the position boundaries, robustness can be increased by trying to use some of the information from the current position, which has been smeared out across the boundary. This can be accomplished by including some distance to the left and right of the position as part of the model, during the model building phase or at another appropriate time. Since various approaches discussed herein take into account potential uncertainty, and because interactions are not modeled across adjacent positions until the sequence optimization phase, these extra regions tend to have less weight in the computation than more central regions. Such effects thus can be treated as random effects.

Figure 7:
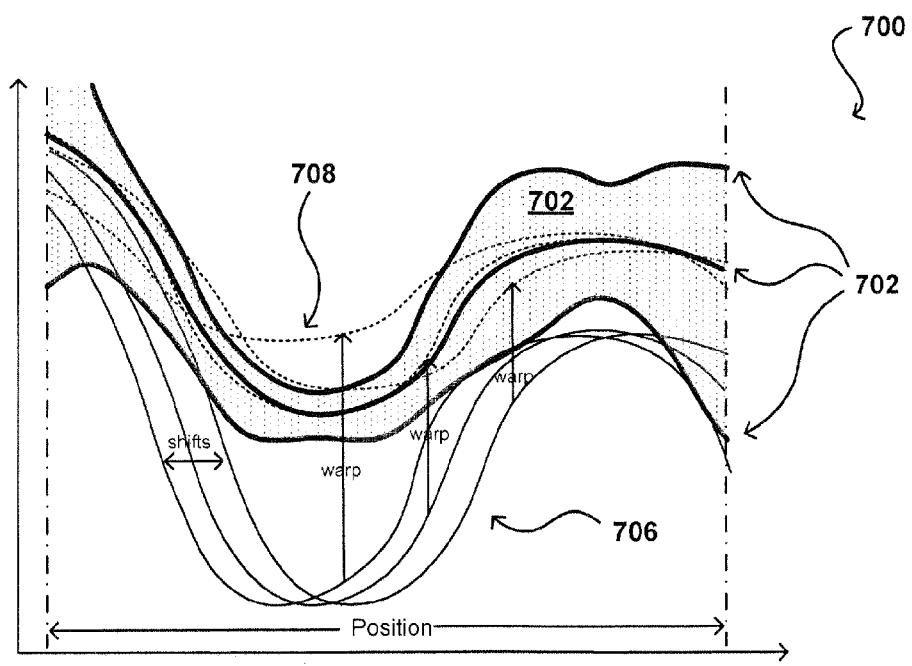
FIG. 7 illustrates an example diagram of a warping procedure that can be used in accordance with various embodiments.

FIG. 7 illustrates an example diagram 700 of a warping procedure applied to three potential shifts at a single position. The thicker solid lines 702 at the pattered region 704 indicate a symbol template mode with the associated variance. The solid lines 706 below the patterned region 704 indicate three shifts of the incoming signal along the x-axis. The dotted lines 708 indicate the result of applying a warping of the shifted signals in order to fit the template model. Each such warp can result in a set of "optimal" warp parameters and an associated likelihood.

After scoring each valid symbol at every position using a process such as those described above, a sequence-wide optimization 516 can be performed to solve for the optimal sequence of symbols. In one embodiment, the sequence-wide optimization can be performed using a Hidden Markov Model (HMM) framework that combines the individual probability distribution of symbol decodes at each position into a distribution over the whole sequence. Starting out from a decoding process such as that set forth above, probability values over two variables $P(s_i, x_i)$ are obtained for each position. These values provide the probability of each valid symbol at each x offset. These distributions can be combined into a model for the whole sequence, such as by creating correlations over the variables in adjacent positions of the sequence. These correlations can be based on the assumption that these variables change relatively slowly along the barcode.

Specifically, a process in accordance with one embodiment can assume that the x offset of adjacent symbols is correlated, and that the warping parameters cached for each potential symbol are similar at adjacent positions (i.e., the distortion should be similar around the same region of the barcode symbol). These correlations can be modeled as Gaussian distributions with tuned covariance parameters. For the offset variables, $x_i$, the correlations can be modeled as Gaussians with zero mean change between adjacent positions, such as by:

$$P(x_{i+1}|x_i) = N(x_{i+1}; x_i, \sigma_{shift})$$

The $s_i$ variables, however, can be correlated based at least in part on their warps. The compatibility of the two warps associated with two neighboring symbols can be compared by their effect on the signal at the boundary between the two positions. There may be a catch, however, in that the value of the signal at the boundary can be dependent on the x-shift of the positions since this shift will change the value at the boundary. This can be overcome by, for example, taking the expectation of the y-value over all possible x shifts, conditioned on the symbol for both the right edge of the left symbol and the left edge of the right symbol. The two values then can again be averaged to come up with a somewhat heuristic mean boundary value. Two warps then can be compared by considering their effect on this grayscale value. An assumption for such a process is that the true warps coming from adjacent positions should be such that the transformed signal is continuous at the boundary. Formally, a left-hand (l) and right-hand boundary (r) can be defined for define for each position value as well, as well as an average (v) of these two, such as may be given by:

$$l_{i,s_i} = E_{x_i|s_i}[f(\text{start}_i + x_i)]$$

$$r_{i,s_i} = E_{x_i|s_i}[f(\text{end}_i + x_i)]$$

$$v_{i,s_i} = \frac{l_{i,s_i} + r_{i,s_i}}{2}$$

where $\text{start}_i$ and $\text{end}_i$ denote the baseline start and end locations of the position without any shifts applied.

A transition probability from $s_i$ to $s_{i+1}$ can be defined in terms of the above, as well as the previously computed warp parameters which are associated with each symbol, offset pair, such as by:

$$P(s_{i+1}|s_i) = N(w_{s_{i+1}}[v_{i,s_i}]; w_s[v_{i,s_i}], \sigma_{warp})$$

Figure 8:
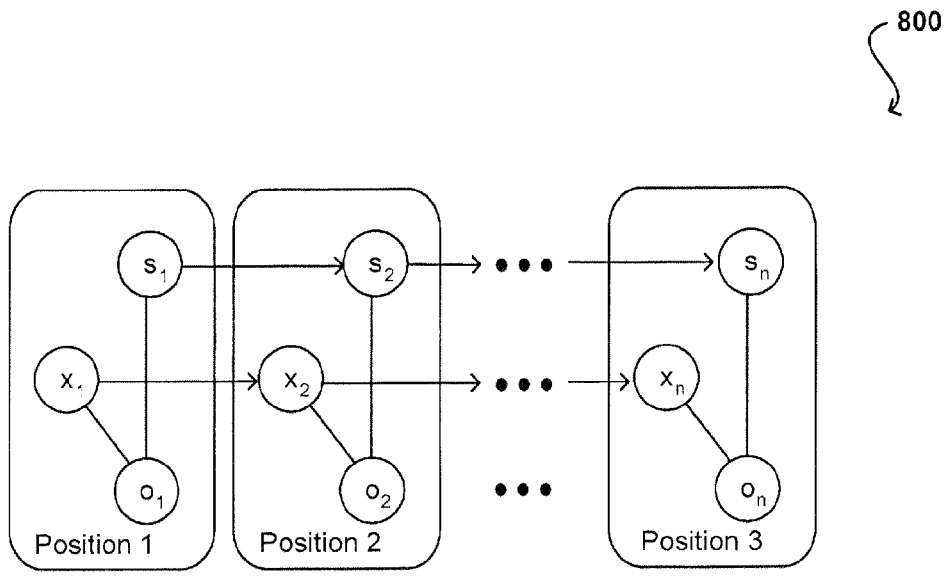
FIG. 8 illustrates an example Bayesian network approach that can be utilized in accordance with various embodiments.

The above equations, when combined with a uniform prior of symbols at each position, and a prior on $x_1$, can result in an HMM given by:

$$P(x_1, s_1) = P(x_1) \cdot P(s_1)$$

$$P(x_{i+1}, s_{i+1}|x_i, s_i) = P(x_{i+1}|x_i) \cdot P(s_{i+1}, s_i)$$

$$P(\overline{o}_i|x_i, s_i) = P_2(w_{\hat{a},\hat{b}}[\overline{o}_i]/T_{s_i})$$

where the observation model can use the same $P_2$ distribution as described above with respect to processes for model building. FIG. 8 illustrates an example of a Bayesian network 800 corresponding to the symbol sequence optimization process. Nodes in the diagram denote variables of interest, with edges showing statistical relationships. Patterned nodes represent observed variables in the example model. The s variables in the figure represent the true hidden state of the symbol at the given position, with the x variables determining how that position is shifted relative to the rest of the sequence. The o variables represent the observed portion of the waveform from that position in the input signal. The statistical relationships are denoted by arrows.

The model in this embodiment is optimized using an efficient implementation of the Max Product Belief Propagation algorithm, although other such algorithms can be used in other embodiments. The result of the algorithm can be a maximum-likelihood sequence of decoded symbols for each position in the barcode. After solving for the most likely sequence, other variant sequence can be considered whenever the top-scoring symbol at a position is close in likelihood ratio to other possible decodes.

In order to significantly reduce the likelihood of false positives in ambiguous situations, at least some thresholding can be performed 518 on the various intermediate scores, as well as on the final likelihood score produced by the sequence optimization. This kind of thresholding can be utilized since there can be multiple failure points in a pipeline such as that described above, which can result in a false positive if only the final score is used as a threshold.

In at least some embodiments, the decoding process can be aborted if the start and end points are determined to not be reasonable based on one or more reasonableness criteria. After an individual digit decoding phase, a likelihood score ratio between the best score and the first score can be considered, where the first score may have been cut off for a process that only considers the top decodes per position for the sequence optimization step). Such a ratio can be used as an indicator of how likely it is that the true digit in the top k results at this position has been captured. If there is not a significant drop-off in scores, potential symbol decodes which do not have a substantially lower score than the ones that were kept may have been dropped in the process. Such thresholding can be beneficial as an optimization model can assume that there is always a valid decode present in the set of symbols presented. If this is not the case, the model can attempt to generate one anyway in at least some embodiments.

After running an inference algorithm, such as a Belief Propagation (BP) algorithm, on the factor graph, an ordering of possible decodes at each position is obtained. The set of top symbols at each position can form a most likely decode sequence. Since it is common for one or two positions to be slightly incorrect, as a true decode may come in second at some position, combinations of the most likely digits can be processed to validate 520 potential combinations. This can include, for example, determining one or more combinations for which the checksum is valid. Any combinations with valid checksums then can be ordered based at least in part upon their respective total sequence scores. In many cases, there will be at most one valid decode as a result of this process. If there are multiple valid decodes, a thresholding process can be utilized to make sure the ratio between the top decode and second decode score is above a certain threshold. Such thresholding can help to ensure that the process does not commit to a false positive in an ambiguous situation. When a single valid barcode remains with the proper ratio, that barcode value can be selected 522 as the appropriate barcode value for the obtained image.

As mentioned, such a process can help to overcome various types of technical challenges with images captured and uploaded by users of various devices of different types. For example, uploaded images can have varying amounts of blur. There are at least two primary sources of blur present in the kind of close-range images captured by conventional portable consumer electronics. The first, motion blur, occurs when the user is moving the device as the image is being taken (or if the object in the image is moving). Motion blur can result in the image being distorted along the direction of motion. A second primary source is out-of-focus blur which often occurs due to the relatively close range at which the barcode is positioned relative to the camera lens when the image is captured. Out-of-focus blur is primarily a problem on cameras without auto-focusing ability. In this case the lens is typically designed to be focused at a distance of a couple of meters from the camera. Even with auto-focus cameras, however, it takes some time for the system to fully focus the image. Being able to decode barcodes even in the presence of blur allows this time to be used effectively.

Aside from blurring artifacts introduced by the optical properties of the imaging system, the camera sensor itself can introduce noise into the image. The effect of this noise on barcode decoding can be modulated by the exposure setting of the camera. In different lighting conditions the full color range of the barcode may take up varying portions of the 0-255 grayscale value spectrum of the image. If there is a bright light source present, for example, the grayscale value of 255 is likely to correspond to the brightness level of this light source rather than the maximum brightness level of the barcode itself. This can result in the entire barcode being compressed into a small portion of the dynamic range. This has the effect of reducing the signal-to-noise ratio of the barcode.

A variation in lighting conditions can also strongly affect the appearance of the barcode patch. Significant influences tend to be overall scene brightness, specularity, shadows, non-uniform illumination, and ambient light color. Although at least some overall scene brightness and ambient light color issues can be addressed using standard image processing techniques, such as contrast stretching), factors such as those mentioned above can induce a non-uniform effect over the image and cause additional difficulties. These can be compounded by the previously-mentioned blurring and noise effects since recovering the precise signal shape involves untangling ambiguities in the underlying barcode caused by blurring and noise from the distortions from the lighting conditions.

Further, although camera sensors are getting increasingly dense at an affordable price, cameras in smart phones and other such portable devices tend not to have as high a resolution as even point- and-shoot cameras. On top of this, the resolution that can be processed in real-time is often be limited by the processing speed of the device rather than the resolution of the sensor itself. Such limitations can necessitate using a sub-sampled image as input to a described algorithm, in at least some embodiments, in order to increase performance. Additionally, the effective barcode resolution can be determined by the resolution of the sensor and the amount of sensor area onto which the barcode is projected. A barcode located closer to the sensor can have a greater effective resolution since more sensor pixels can be used to record the signal. This effect can be counter-balanced by increasing out-of-focus blur as distance to the sensor decreases.

Using processes discussed and suggested herein, a computing device having access to a decoding algorithm and the barcode templates can capture and analyze an image of a barcode, in order to determine information encoded in the barcode. This information then can be used for any of a number of purposes as discussed elsewhere herein. In one example, a user might see a product or item of interest, such as a book, and might take a picture of a barcode on the cover of the hook in order to obtain information about the book, such as related books, user reviews, or other such information. The user can utilize any appropriate image capture element on the device, such as a digital still or video camera.

In some cases, a process in accordance with a given embodiment might not provide acceptable accurate results due at least in part to some aspect of the barcode and/or captured image. In at least some embodiments, the matching process can continue with additional steps to attempt to find a match while accounting for a number of potential aspects or issues with the captured information. For example, the process might perform additional steps to attempt to handle other barcode formats, such as UPC-E or EAN-8. The process also might attempt to correct for any noise in a central set of rows or other portion of the image, such as where there were specular reflections in the captured image or the barcode was damaged in some way. The process might also attempt to address the fact that the barcode might be placed on a curved or other non-flat surface, such as where the barcode is on a bottle or can.

For other barcode formats, many of the steps or approaches described above can be applied as well. In some embodiments, the process can first be run for a most common barcode format, and then can be re-run for each of a number of other less common formats until a match is found or it is determined that the image cannot be decoded. In other embodiments, certain steps of the process can be performed multiple times for different formats, such that the entire process does not have to be repeated in sequence for each potential format until a match is found. Similarly, when favorable results cannot be obtained using a given scanline, additional scanlines can be analyzed for the same image. These additional scan line attempts can be done serially as well, or multiple scan lines can be analyzed at the same time in order to decrease the average result time, although such an approach would also increase the average amount of resources needed to find a result. Similar additional processing can be required to address the potential for a curved barcode. Fortunately, the processes described herein can be performed quickly, such that multiple variations of the barcode decoder can be executed concurrently in order to attempt to capture any anticipated variation. Various combinations of the processes can be utilized for each incoming image to attempt to obtain the most accurate barcode results.

Figure 9:
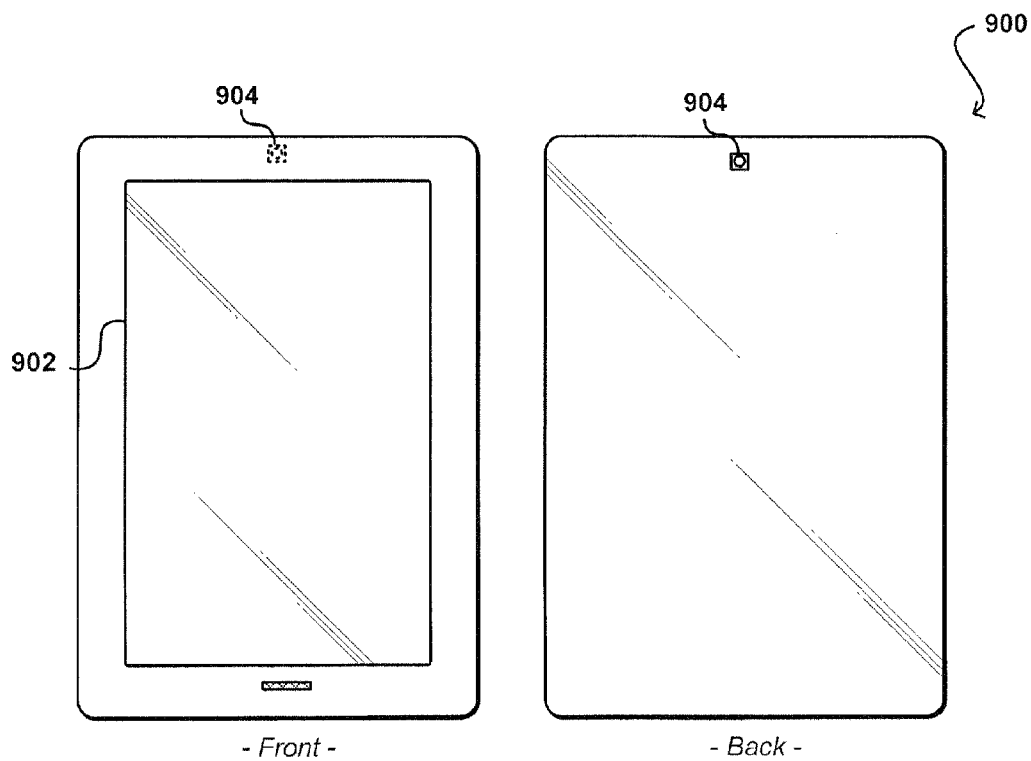
FIG. 9 illustrates front and back views of an example device that can be used in accordance with various embodiments.

FIG. 9 illustrates an example of a computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902, which under normal operation will display information to a user facing the display screen (e.g., on the same side of the computing device as the display screen). The computing device in this example can include one or more image capture elements, in this example including one image capture element 904 on the back side of the device, although it should be understood that image capture elements could also, or alternatively, be placed on the sides or corners of the device, and that there can be any appropriate number of capture elements of similar or different types. Each image capture element 904 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 10:
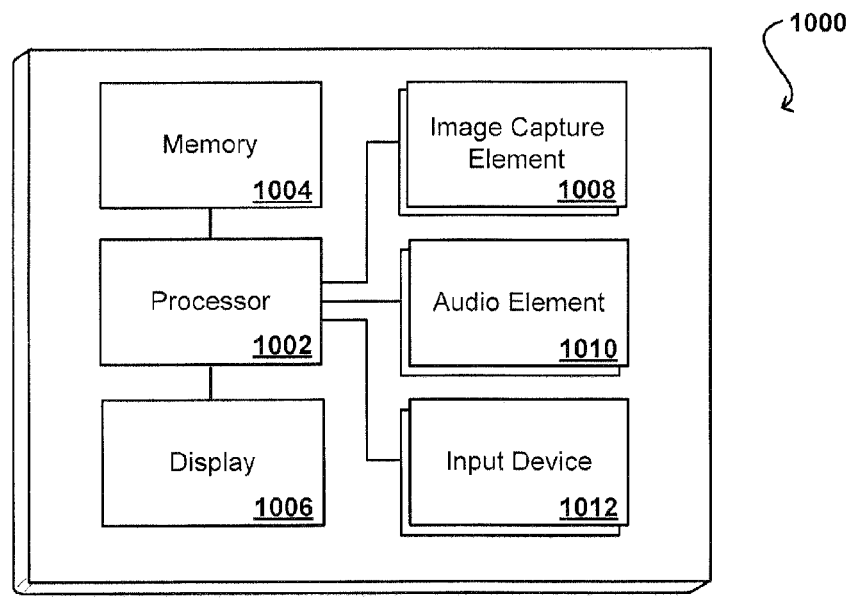
FIG. 10 illustrates an example configuration of components of a device such as that described with respect to FIG. 9.

FIG. 10 illustrates a set of basic components of a computing device 1000 such as the device 900 described with respect to FIG. 9. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1008, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
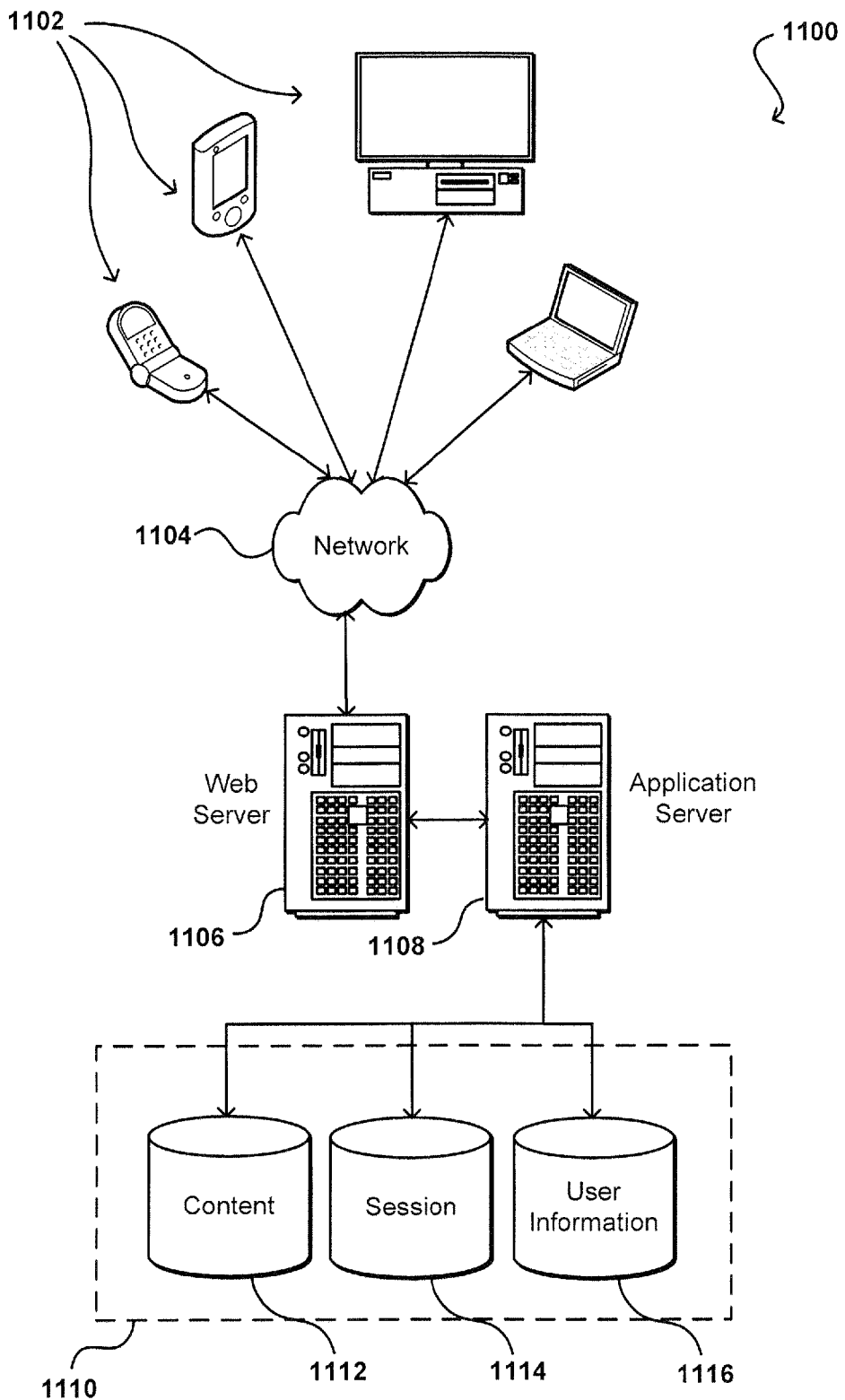
FIG. 11 illustrates an example environment in which various aspects of the various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information

1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for decoding a barcode using a computing device, comprising:
   determining a set of symbols capable of being contained in a barcode image;
   generating appearance models for the set of symbols at least in part by simulating a plurality of image distortions for each of the set of symbols;
   obtaining an image to be analyzed;
   extracting a barcode signal from a potential barcode region of the obtained image;
   locating limits of the barcode signal and normalizing a signal scale of the barcode signal to determine an approximate location of each digit in the potential barcode region;
   generating symbol scores for each of a plurality of the set of symbols for each digit location in the potential barcode region;
   analyzing combinations of symbols for the potential barcode region to determine at least a top combination, each symbol of a combination being selected based at least in part upon the symbol score for that symbol at a location in the potential barcode region; and
   selecting the top combination as a value of a barcode in the obtained image when the top combination has a valid checksum.

2. The computer-implemented method of claim 1, further comprising:
   selecting a next best combination with a valid checksum as a value of the barcode when the top combination does not have a valid checksum.

3. The computer-implemented method of claim 1, further comprising:
   performing a sequence-wide optimization on the combinations of symbols by combining an individual probability distribution of symbol decodes at each position into a distribution over the entire combination.

4. The computer-implemented method of claim 1, wherein the sequence-wide optimization is performed using a Hidden Markov Model (HMM) framework.

5. The computer-implemented method of claim 1, further comprising:
   creating a parametric probability model and a non-parametric parametric probability model for each of the set of symbols.

6. A method of decoding a barcode in an image, comprising:
   under control of one or more computing devices configured with executable instructions,
      analyzing an obtained image to locate a potential barcode region;
      determining a set of symbols that are able to be located at each of a plurality of digit locations in the potential barcode region;
      modeling a set of distortions for the obtained image;
      training a set of symbol models for the set of symbols based at least in part upon the set of distortions;
      determining symbol scores for the symbols at each digit location in the potential barcode region using the symbol models;
      analyzing combinations of the symbols for the potential barcode to determine at least a top combination, each symbol of a combination being selected based at least in part upon the determined symbol score for that symbol at a digit location in the potential barcode region; and
      selecting the top combination with a valid checksum as a value of a barcode.

7. The method of claim 6, further comprising:
   wherein the set of symbol models include a parametric probability model and a non-parametric parametric probability model for each of the set of symbols.

8. The method of claim 6, further comprising:
   removing a combination as a potential top combination when a ratio of the combination with a highest decode score does not at least meet a threshold value with respect to a combination with a next-highest decode score.

9. The method of claim 6, wherein determining symbol scores for the symbols includes determining potential adjacent symbols and analyzing effects of the potential adjacent symbols on a symbol template for a symbol.

10. The method of claim 6, wherein determining symbol scores for a symbol includes simulating two or more types or levels of image distortion for a symbol template of the symbol.

11. The method of claim 10, wherein the types of image distortion include at least one of image blur, sensor noise, resolution constraint-induced distortion, and lighting variation.

12. The method of claim 10, wherein the types of image distortion are produced by a fixed focus camera or a non-autofocus camera.

13. The method of claim 6, further comprising:
   locating limits of the barcode signal and normalizing a signal scale of the barcode signal to determine each approximate digit location in the potential barcode region.

14. The method of claim 6, wherein determining symbol scores for the symbols includes creating at least one generative probabilistic model for each symbol using an artificial data set created by simulating variations in image quality.

15. The method of claim 14, wherein a first generative model is created for locating a best symbol for a location and a second generative model is created for scoring the symbols.

16. The method of claim 6, further comprising:
   performing pre-processing of the obtained image including at least one of converting the image to a grayscale image or normalizing color values of the image.

17. The method of claim 6, wherein determining symbol scores for the symbols includes shifting portions of the image by one or more amounts or stretching at least one portion of the image.

18. The method of claim 6, further comprising:
   determining a rough start position and a rough end position for the potential barcode region and refining the rough start position and the rough end position using at least one optimization technique.

19. The method of claim 18, wherein the at least one optimization technique generates a set of warping parameters capable of being used to de-warp the barcode signal into a standard scale.

20. The method of claim 18, wherein the at least one optimization technique utilizes a Hidden Markov Model (HMM) framework.

21. The method of claim 18, wherein the at least one optimization technique leverages a graphical model to establish a consistency of warp parameters across digits of the barcode.

22. The method of claim 21, wherein the digits are independent in space.

23. The method of claim 6, further comprising:
  determining an item associated with the value of the barcode; and
  providing information about the item.

24. The method of claim 6, wherein the image is obtained by capturing the image using a camera of a computing device.

25. A computing device, comprising:
  a processor;
  an image capture element; and
  memory storing instructions that, when executed by the processor, cause the computing device to:
    capture an image of a barcode using the image capture element;
    analyze the image to locate a potential barcode region;
    determine a set of symbols that are able to be located at each of a plurality of digit locations in the potential barcode region;
    create a parametric probability model and a non-parametric parametric probability model for each of the set of symbols;
    determine symbol scores for the symbols at each digit location in the potential barcode region;
    analyze combinations of symbols for the potential barcode to determine at least a top combination, each symbol of a combination being selected based at least in part upon the determined symbol score for that symbol at a digit location in the potential barcode region; and
    select the top combination as a value of a barcode.

26. The computing device of claim 25, wherein determining symbol scores for the symbols includes determining potential adjacent symbols and analyzing effects of the potential adjacent symbols on a symbol template and simulating two or more types or levels of image distortion for a symbol template of the symbol.

27. The computing device of claim 25, wherein the instructions when executed further cause the computing device to:
  repeat the determine, analyze, and select steps for a different barcode format if no potential barcode combination has a valid checksum.

28. The computing device of claim 25, wherein the instructions when executed further cause the computing device to:
  select a different scan line if no potential barcode combination has a valid checksum.

29. A non-transitory computer readable storage medium storing instructions for decoding an image of a barcode, the instructions when executed by a processor causing the processor to:
  determine a set of symbols capable of being contained in a barcode;
  for each digit location in a barcode format, determine symbols that are capable of being placed at the location and one or more adjacent locations;
  simulating a plurality of image distortions for the symbols at each location, at least some of the simulations including the potential symbols at one or more adjacent locations to a parametric probability model and a non-parametric parametric probability model for each of the symbols;
  training the models for the symbols; and
  storing at least a portion of the trained models as appearance models for the set of symbols.

30. The non-transitory computer readable storage medium of claim 29, wherein the plurality of image distortions includes at least one of image blur, sensor noise, resolution constraint-induced distortion, and lighting variation.

* * * * *